United States Patent [19] [11] Patent Number: 4,632,608
Blomberg et al. [45] Date of Patent: Dec. 30, 1986

[54] CUTTING INSERT

[75] Inventors: Sven G. Blomberg, Arsunda; Sven G. Berter; Lars T. Pettersson, both of Gävle, all of Sweden

[73] Assignee: Santrade Limited, Luzern, Switzerland

[21] Appl. No.: 731,878

[22] Filed: May 8, 1985

[30] Foreign Application Priority Data

May 14, 1984 [SE] Sweden ............................. 8402580

[51] Int. Cl.⁴ ............................................. B26D 1/00
[52] U.S. Cl. ................................... 407/114; 407/115
[58] Field of Search ...................... 407/113, 114, 115

[56] References Cited

U.S. PATENT DOCUMENTS 1,926,531 9/1933 Graham ............................ 407/90
4,084,917 4/1978 Stumpp .

FOREIGN PATENT DOCUMENTS 133168 2/1985 European Pat. Off. ............ 407/115
43-270 7/1969 Japan ................................... 407/114
101786 8/1977 Japan .

Primary Examiner—Leonidas Vlachos
Attorney, Agent, or Firm—Burns, Doane, Swecker & Mathis

[57] ABSTRACT

An indexable cutting insert for a variety of turning operations, which mainly has a rhombical or triangular basic form. The cutting corners of the cutting insert are provided with nose portions. Each nose portion is expanded in the width direction at an acute-angled corner mainly symmetrically about the bisector of the cutting corner. Thus the cutting insert achieves a locally large setting angle or clearance angle.

10 Claims, 7 Drawing Figures

CUTTING INSERT

BACKGROUND AND OBJECTS OF THE INVENTION

The present invention relates to a cutting insert for longitudinal turning, inwards copy-turning, turning of grind reliefs and outwards copy-turning or for a combination of two or more of said machining operations. The cutting insert mainly has rhombic or triangular basic shape comprising at least on cutting corner, at least one nose portion arranged in the cutting corner and two main cutting edges connected to the nose portion. The main cutting edge has a mainly straight contour in the area which is closest to the connection to the nose portion and the nose portion is expanded in the width direction at an acute-angled cutting corner symmetrically around the bisector thereof, such that the setting angle and/or the clearance angle will be locally large during machining of a work piece.

Conventional cutting inserts for use in the above-mentioned turning operations present drawbacks during machining of a work piece. Poor surfaces are generated at inwards copy-turning and longitudinal turning due to friction between the surface of the work piece and the side of the cutting insert because the clearance angle thereof is too small. The chip control becomes poor at outwards copy-turning as the chips will get broad and thin with a cutting insert having a small setting angle relative to the work piece surface. Furthermore the straight sides of the cutting insert render keyway slotting practically impossible.

The object of the present invention is to provide a cutting insert for turning, which solves the above-mentioned problems.

DESCRIPTION OF THE DRAWINGS

The invention will be more closely described hereinafter with reference to the appended drawings disclosing preferred embodiments from which further characterizing features of and advantages with the invention will become apparent.

DESCRIPTION OF A PREFERRED EMBODIMENT OF THE INVENTION

Figure 1:
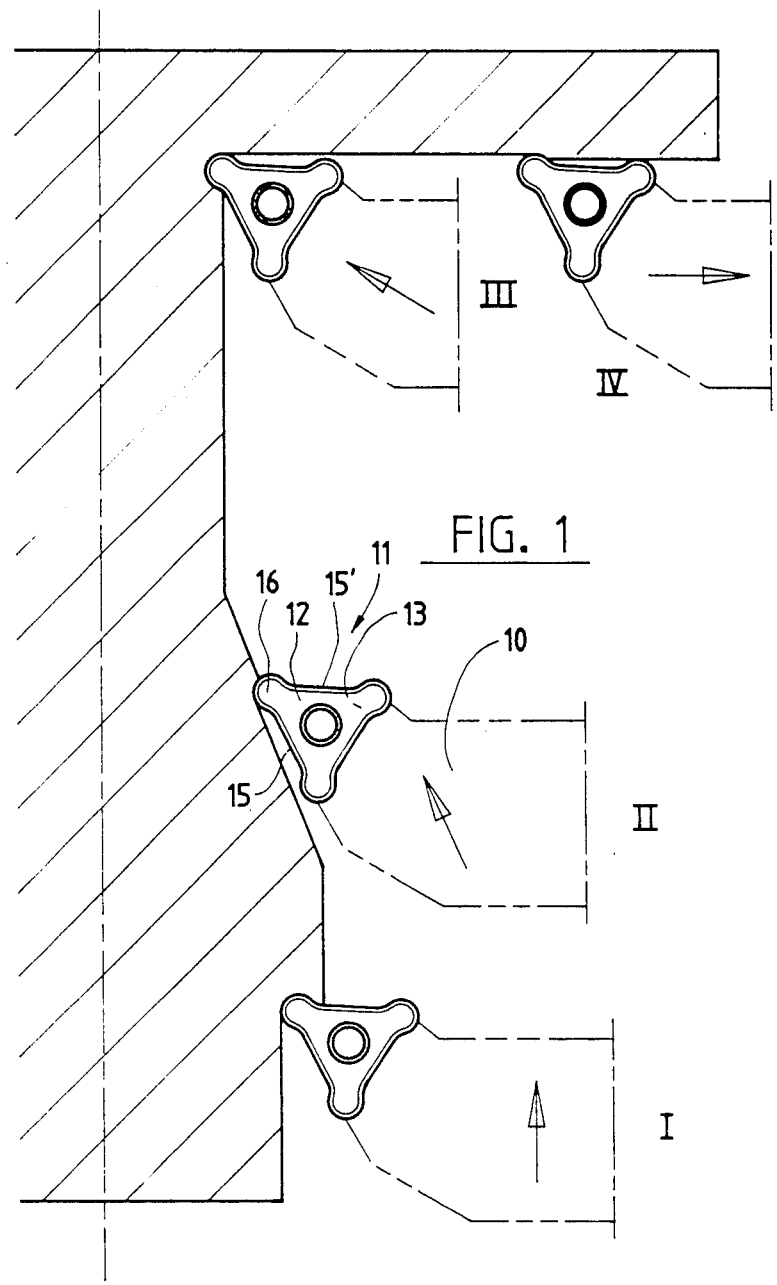
FIG. 1 is a plan view of an indexable cutting insert according to the invention at longitudinal turning, inwards copy-turning, turning of grind reliefs and outwards copy-turning, respectively.
Figure 2:
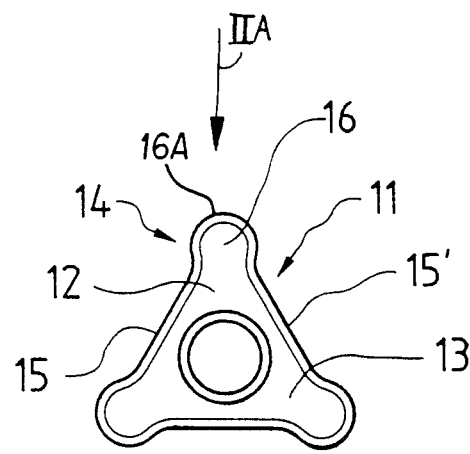
FIG. 2 is a plan view of the cutting insert, in magnification, according to FIG. 1.
Figure 2A:
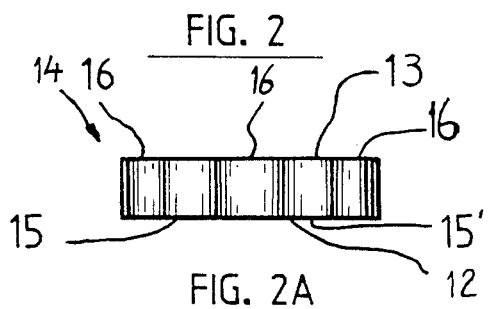
FIG. 2A is a side view of the cutting insert according to the arrow IIA in FIG. 2.

FIGS. 1, 2 or 2A show a cutting insert secured to a holder (depicted in broken lines) in four machining operations; longitudinal turning I, inwards copy-turning II, turning of grind reliefs III and outwards copy-turning IV, respectively. The feed direction in each operation is illustrated by arrows. The cutting insert holder 10 has a wafer-like indexable cutting insert 11 according to the invention in its site. The indexable cutting insert has a triangular, negative basical shape, the flat surfaces 12, 13 of which are mainly parallel to each other. The flat surfaces 12, 13 are perpendicularly connected by edge surfaces whose lines of junction with the flat surface 12 (except in the cutting corners) are hereinafter called cutting edges 15, 15'. The basical shape of the indexable cutting insert 11 may also be positive, i.e. the flat surfaces 12, 13 are not perpendicularly connected by the edge surfaces. The length of all edge surfaces is the same. The edge surfaces define main cutting edges 15, 15'. The main cutting edge 15 defines an acute angle with the adjoining main cutting edge 15' and a nose portion 16 is provided at the transition between said main cutting edges 15, 15'. The nose portion is uniformly curved between the main cutting edges 15, 15'. The cutting corners 14 of the indexable cutting insert 11 are identical and therefore only one cutting corner is described below. A nose portion 16, formed in the area of the point of junction between the main cutting edges 15, 15', whose periphery is of circular shape, has a cutting edge 16A which is smoothly connected to the cutting edges via a concave portion. The centre of the radius of the nose portion 16 is arranged such that the cutting corner 14 becomes widened. The periphery of the nose portion 16 may also have a noncircular shaping such as cambered or straight segments or a combination of different segments.

The cutting insert 11 cuts deeply into the work piece during the longitudinal turning I in a direction parallel to the rotational axis of the work piece with both the main cutting edge and a major part of the nose portion and therefore the generated surface achieves a good surface fineness due to the smoothly rounded nose portion. Any turning operation, except turning of the grind reliefs, whose feed direction is not parallel with the centre axis of the work piece is defined here as copy-turning. The main cutting edges do not participate in the machining during the inwards copy-turning II, just a part of the nose portion separates chips from the work piece and therefore the main cutting edge closest to the work piece may be nearly parallel with the generated surface without obtaining wear on the connected edge surface. The object of turning of the grind reliefs III is to form a slot in the work piece in order to present carefully defined corners for a finishing grinding machining. In this case a major part of the nose portion is used during the machining. The setting angle is locally increased, at the outwards copy-turning IV with the present cutting insert geometry, in the part of the nose portion which cuts chips. The cutting insert 11 is arranged with a central aperture to receive a clamping device, but it may also be without this. As can be seen in FIG. 1 at least a part of the nose portion 16 engages the work piece in all the machining operations such that mainly the whole periphery of the nose portion has been in engagement with the work piece after the executed machinings.

Figure 3:
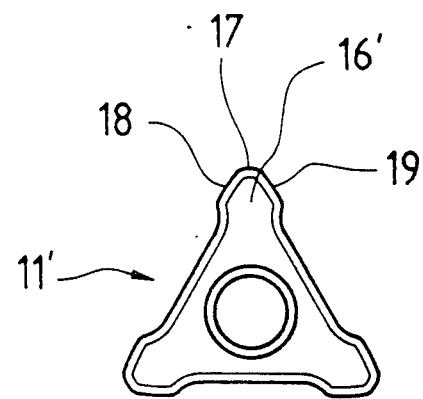
FIGS. 3-5 show alternative embodiments of indexable cutting inserts according to the invention.
Figure 6:
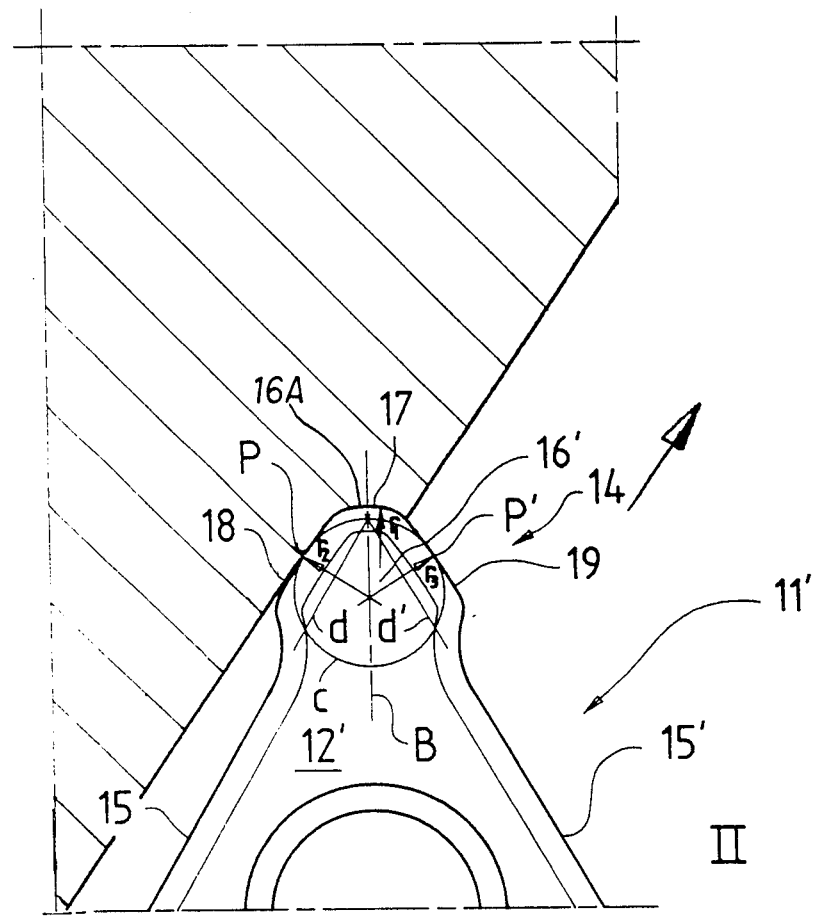
FIG. 6 shows a cutting corner according to FIG. 3 in magnification.

FIG. 3 shows a triangular indexable cutting insert 11', the nose portions 16' of which are not circular. The periphery of the nose portion 16' consists of a number of segments 17, 18, 19 having different radii of curvature, which segments are symmetrically arranged in FIG. 3 around the bisector of the cutting corner. FIG. 6 is a magnification of a cutting corner according to FIG. 3 during inwards copy-turning in a work piece, according to the direction of the arrow. The cutting corner 14 is divided by the bisector B such that both parts of the cutting corner become identical. The radii $r_2$ and $r_3$ of the cambered segments 18, 19, respectively, are in this case identical and larger than the radius $r_1$ of the cambered segment 17 in order for the cutting insert to be exposed to lower forces than the former cutting insert, but the radii relationship may be chosen differently. An imaginary circle C is marked in the figure, which touches the periphery at a point P, P' on both sides of the bisector B. The width of the corner cutting edge 16A (i.e., the dimension perpendicular to the bisector B) is such that two imaginary lines d, d' which are extensions of the mainly straight parts of the cutting edges 15, 15', which lie closest to connections to the periphery of the nose portion, form chords in the circle. The number of touch points may vary on both sides of the bisector due to the contour of the periphery and in a cutting insert according to FIGS. 1 and 2 the circle coincides with the nose portion along its entire periphery within 200° to 330° relative to the centre of the nose radius. The length of each chord is 5 to 30% of the length of the connected cutting edge, preferably 10 to 20%. The main cutting edge 15 will therefore be retracted from the machining area so that the setting angle at inwards copy-turning and also the setting angle at outwards copy-turning is locally increased at the nose portion Furthermore the nose portion 16' in FIG. 6 is shaped with cambered broad levels so that they give the work piece an enhanced surface fineness in outwards and inwards copy-turning.

Figure 4:
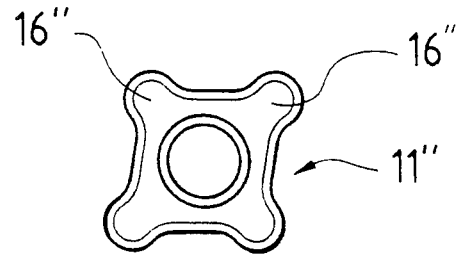
Figure 5:
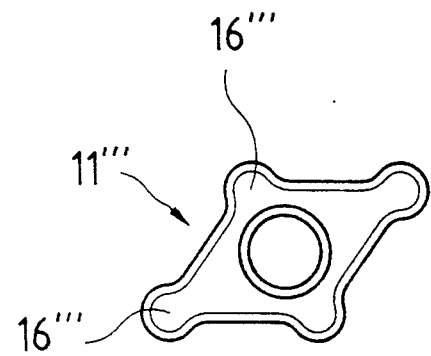

In FIGS. 4 and 5 two rhombical cutting inserts 11" respective 11''' are shown, which are arranged with circular nose portions 16", 16''' in all cutting corners. The nose portions are symmetrically arranged relative to both the longest diagonal and the shortest diagonal in respective cutting inserts. The two cutting inserts 11", 11''' differ from each other in that the cutting insert 11" has a smaller nose angle and is therefore more suited for finishing and gives increased accessibility at copy-turning while the other cutting insert 11''' is used for roughing. The nose portions of the obtuse-angled cutting corners will be used for outwards copy-turning only. The cutting serts 11", 11''' may also be provided with the type of nose portions shown in FIGS. 3 and 6.

A suitable interval concerning the sizes of the radii for the above-mentioned cutting inserts, in which the periphery of the nose portions describes a circle, is between 1 to 5 mm, preferably 2 to 4 mm.

Thus, the present invention relates to a cutting insert whose shape makes a versatile use of it possible without the edge surfaces of the cutting insert being worn.

The invention is not limited to the embodiments described above and shown in the drawings. Thus, the basical shape of the cutting insert and the shape of the nose portion may be selected depending on the machining demands. The chip surfaces of the cutting insert may be provided with chipbreakers such as recesses, grooves and/or projections.

We claim:

1. Cutting insert for longitudinal turning, inwards copy-turning, turning of grind reliefs, and outwards copy turning, said insert comprising at least one cutting corner, and two main cutting edges oriented at an acute angle relative to one another and extending to said cutting corner, said cutting corner including a cutting edge which extends from a junction with one of said main cutting edges to a junction with the other main cutting edge and being symmetrical relative to an imaginary bisector of said cutting corner, a section of each said main cutting edge located immediate adjacent the junction with said corner cutting edge being substantially straight, the width of the corner cutting edge being such that imaginary extensions of said straight sections form chords in an imaginary circle which is inscribed in said cutting corner such that said circle touches said corner cutting edge in at least one place on each side of said bisector.

2. Cutting insert according to claim 1, characterized in that the length of each said chord is in the range of from 5 to 30% of the length of each main cutting edge.

3. Cutting insert according to claim 2, wherein said range is from 10 to 20%.

4. Cutting insert according to claim 1, characterized in that the length of all sides of said insert is the same, said corner cutting edge being uniformly curved between said main cutting edges and describing a part of a circle of at least 200 degrees.

5. Cutting insert according to claim 1, wherein said corner cutting edge comprises a number of segments.

6. Cutting insert according to claim 5, wherein said segments include a first segment bisected by said bisector and having a first radius and two additional segments on opposite sides of said bisector having identical radii which are different from said first radius.

7. Cutting insert according to claim 6, wherein said first radius is smaller than the radii of said additional segments.

8. Cutting insert according to claim 1, wherein said cutting insert is shaped as a rhombical indexable cutting insert.

9. Cutting insert according to claim 1, wherein said cutting insert is a triangular indexable cutting insert.

10. Cutting insert according to claim 1, wherein chip breakers are arranged inside the periphery of the cutting insert.

* * * * *